May 5, 1942.   T. H. RANSOME   2,282,244
HIGH PRESSURE SAFETY VALVE
Filed Dec. 26, 1939   3 Sheets-Sheet 1

INVENTOR.
TALLENT H. RANSOME
BY
Chas. E. Townsend.
ATTORNEY.

May 5, 1942.    T. H. RANSOME    2,282,244
HIGH PRESSURE SAFETY VALVE
Filed Dec. 26, 1939    3 Sheets-Sheet 2

INVENTOR.
TALLENT H. RANSOME
BY
Chas. E. Townsend.
ATTORNEY.

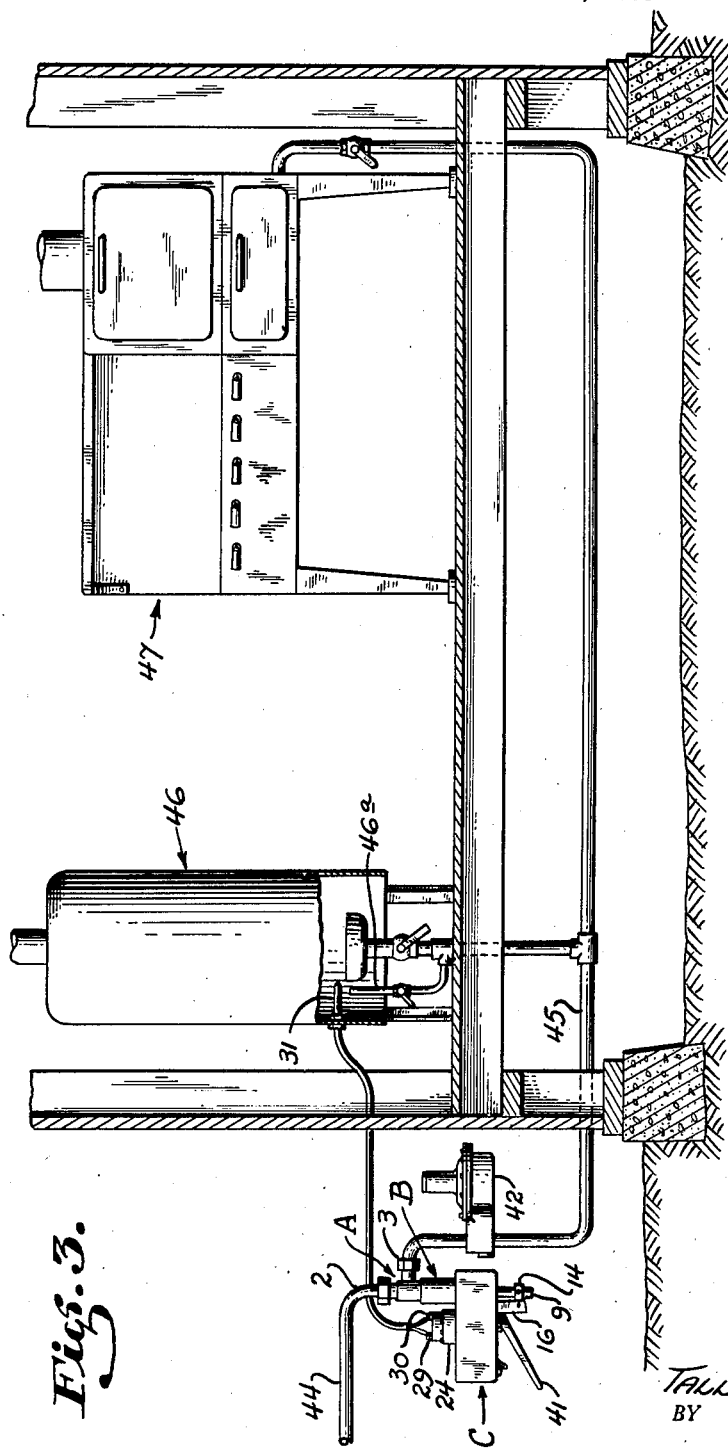

Patented May 5, 1942

2,282,244

UNITED STATES PATENT OFFICE 2,284,244

HIGH PRESSURE SAFETY VALVE

Tallent H. Ransome, Berkeley, Calif., assignor to Ransome Company, Emeryville, Calif., a corporation of California Application December 26, 1939, Serial No. 310,981

2 Claims. (Cl. 137—139)

This invention relates to high pressure safety valves, especially intended for use in connection with liquefied gases such as butane, propane, or a mixture of the same or similar gases.

Liquefied butane, propane, and similar gases or a mixture of the same are extensively used in many districts, both for domestic heating and cooking and for power plant and other operations. To employ such gases a vaporizing apparatus or plant is required, particularly where the lower boiling point gases such as butane are used. A vaporizing apparatus of this character requires a main burner to supply the latent heat of vaporization and this in turn requires a pilot burner, as the average apparatus is automatic and intermittent in operation, which means that the main burner goes off and on as the demand for gas varies. A main shutoff or safety valve is interposed between the fuel or gas tank and the vaporizer and this must be automatically closed in the event of failure in any part of the apparatus and particularly if the pilot burner becomes extinguished because of failure from any cause.

The present invention relates to such a safety or shutoff valve and the object of the invention is generally to improve and simplify the construction and operation of such valves; to provide a valve which will automatically close upon failure of the pilot flame or other parts of the apparatus; to provide a valve which can only be opened by manual operation and re-lighting of the pilot flame; to provide a valve with connected actuating mechanism which is particularly applicable where high pressure gas or liquid is employed; to provide a valve which is electrically actuated and in which the electric current employed is generated by the heat of the pilot flame; to provide a valve which will automatically close in the event of fire exterior of or adjacent the apparatus; and further, to provide a valve which is exceedingly simple in construction and dependable in operation.

The valve and connected operating parts are shown by way of illustration in the accompanying drawings, in which—

Fig. 3 is a diagrammatic view showing an installation or application of the invention.

Figure 1:
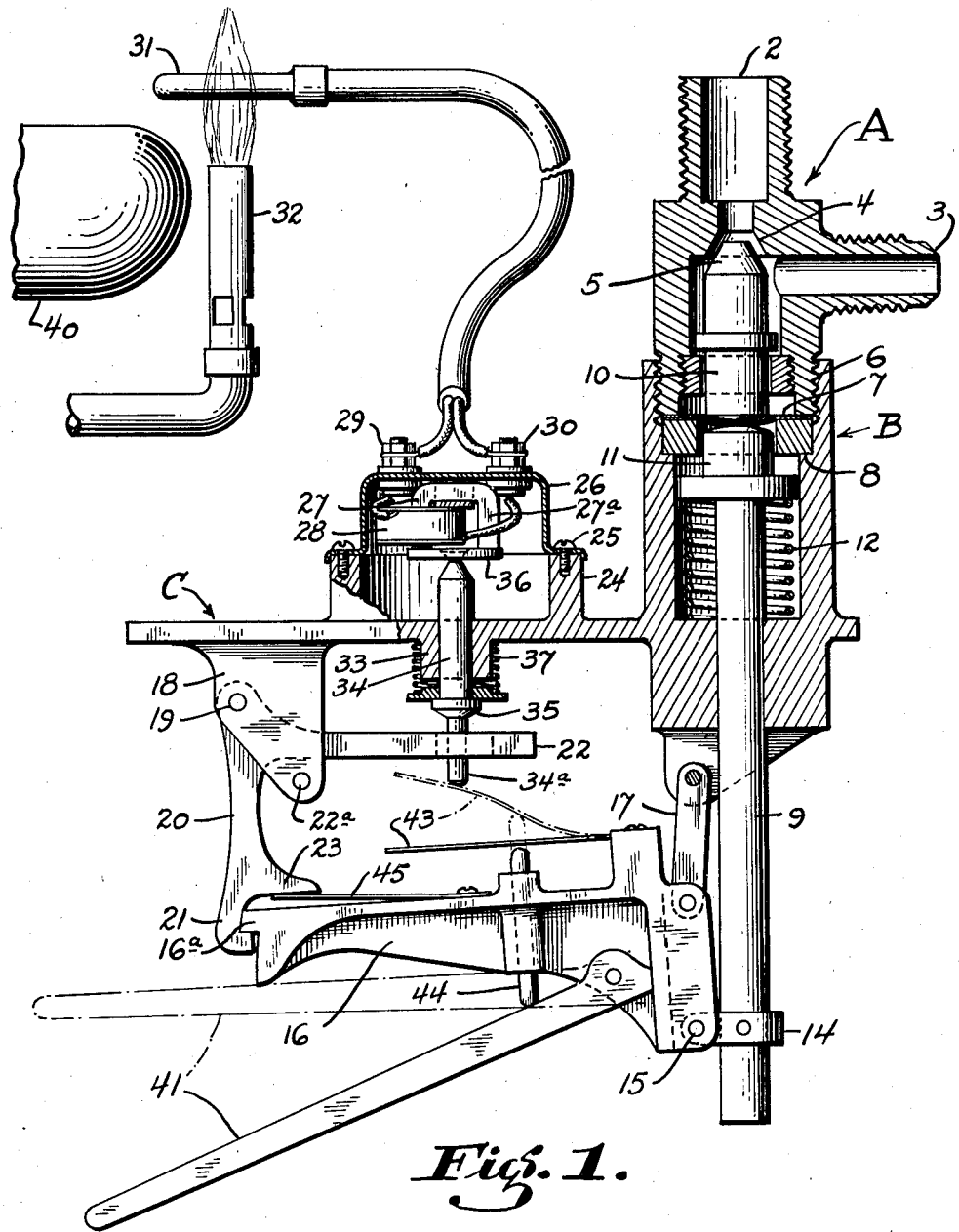
Fig. 1 is a side elevation of the valve and connected operating mechanism, partially in section, said view showing the valve in open position.
Figure 2:
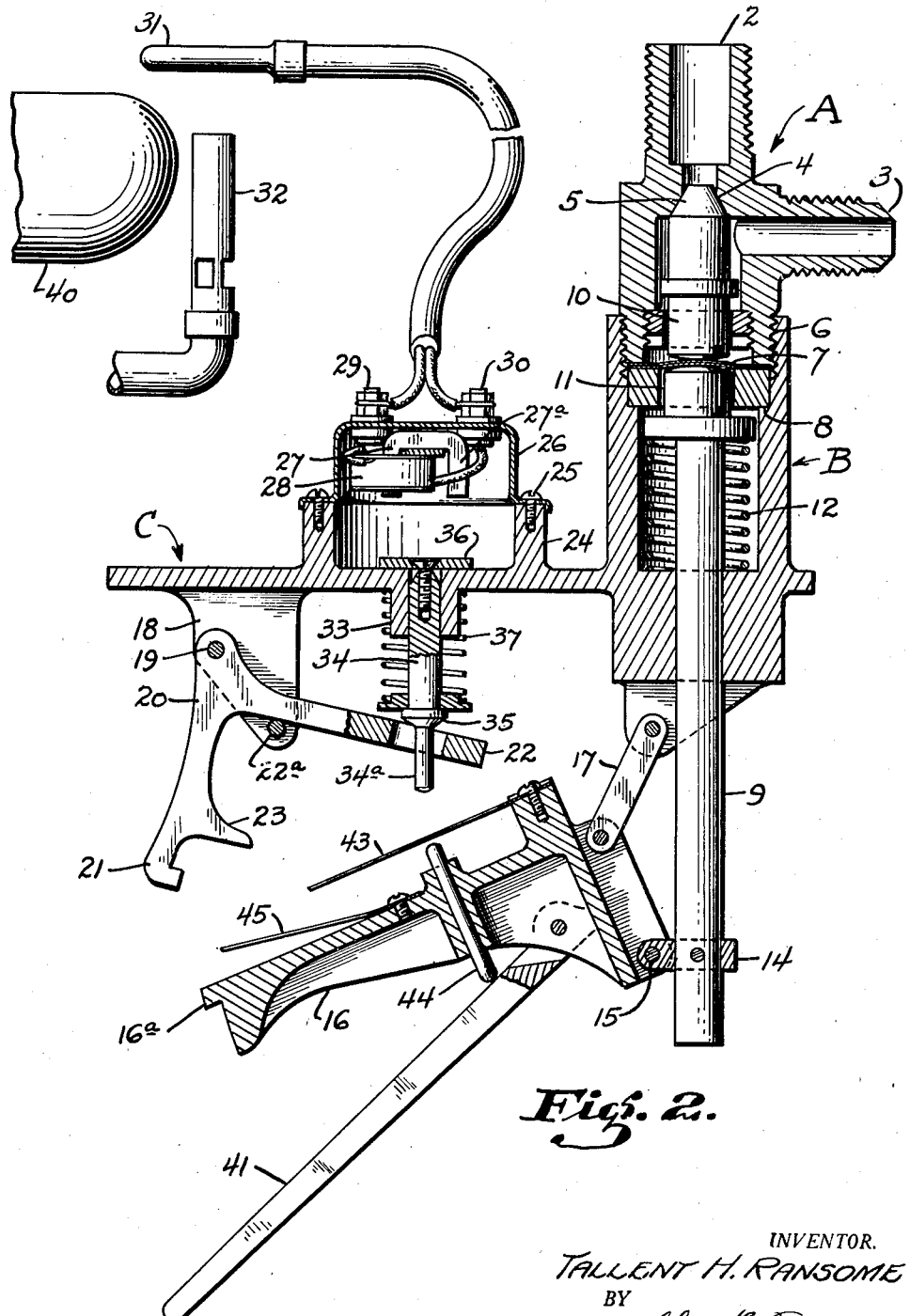
Fig. 2 is a similar view showing the valve in closed position.

Referring to the drawings in detail and particularly to Fig. 2, A indicates a valve body or casing on which is formed an inlet connection 2 and a discharge connection 3. These connections provide a flow passage in which is formed a valve seat 4 and movable to and away from the seat to open or close the flow passage is a valve 5. The valve body is mounted on a cylindrical-shaped housing B forming a part of a bracket plate C. A screw connection 6 is formed between them and this connection is utilized to clamp and secure a flexible diaphragm 7 between the valve body and a collar supported by a shoulder 8 formed within the housing to form a gas-tight packing and at the same time permit actuation of the valve 5. Slidably mounted in the housing B is a plunger rod 9, the upper end of which is provided with a head 11 which is adapted to engage the diaphragm. Engageable with the opposite side of the diaphragm is a stem 10 forming a part of the valve 5. Interposed between a head 11 and the lower end of the housing B is a spring 12 which tends to force the head end of the rod against the diaphragm with sufficient pressure to flex it and thereby move the valve upwardly and maintain it in closed position. Secured on the lower end of the rod 9 is a collar 14 and pivotally connected therewith as at 15 is an arm 16 which will hereinafter be referred to as a cocking lever. A toggle link 17 is also pivotally connected with the arm 16 and the lower end of the housing B and serves the function when the arm 16 is swung into the position shown in Fig. 1 of pulling the rod 9 downwardly or away from the diaphragm so as to permit opening of the valve 5.

Formed on the lower face of the bracket plate C is a pair of spaced bearing lugs 18 and pivoted between said lugs as at 19 is an arm 20 which terminates in a hook 21 hereinafter to be referred to as the trigger. Formed integrally with the arm 20 are a pair of laterally extending arms 22 and 23, and disposed between the bearing lugs 18 and below the arm 22 is a stop pin 22a which limits swinging movement of arm 20 in an outward direction. Formed on the upper face of the bracket plate is an annular flange 24 and secured thereto by screws 25 or similar means is a housing 26 in which is secured a horse-shoe-shaped electro-magnet comprising connected legs 27 and 27a. Surrounding leg 27 is a field coil 28, the terminals of which are connected with binding posts 29 and 30 insulated from the housing 26; and connected with the binding posts through wires, as shown, is a thermo-couple 31, which is adapted to be mounted above or in the flame area of a pilot burner indicated at 32. This thermo-couple supplies the current to energize the magnet. On the under side of the bracket plate C and centrally disposed with relation to the annular flange 24 is a bearing box 33 through which extends a plunger 34 terminating in a hammer head 35. On the upper end of the plunger is secured an armature plate 36 which is adapted to engage the legs of the electro-magnet and to be held thereby when this is energized. A spring 37 is interposed between the hammer head 35 and the bracket plate and serves to drive the plunger and hammer against arm 22 with sufficient force to release the trigger 21 as will hereinafter be described.

It is well known that the amount of current generated by a thermo-couple is very small, and in many instances is not sufficient to energize the magnet to the degree required. It is for this reason that a horse-shoe magnet is employed, as this may be permanently energized but at the same time will not produce a magnetic field strong enough to hold the armature plate 36 against the pressure of spring 37. On the other hand, when the pilot burner is burning and heats the thermo-couple, the current generated and passing through the coil 28 will further energize or increase the intensity of the magnetic field to a sufficient degree to hold the armature 36 in raised position. Hence the current generated by operation of the pilot burner is depended upon to maintain the valve 5 in open position. Electrically operated mechanism of varying forms has heretofore been employed for closing a main valve, but the current employed has been supplied from an exterior source such as a power line, batteries, etc. If such exterior source of current supply fails for any reason whatsoever, the whole plant may fail. It is for this reason that current generated by the pilot burner or the gas itself is employed in the apparatus here disclosed so that outside failures can not interfere with or bring about failures in the operation of the apparatus.

In actual practice, it will be understood that the inlet 2 on the valve body A is connected through a pipe with a suitable source of liquid gas supply or the like, and that the discharge connection 3 is connected through a pipe with a suitable vaporizer. These parts are not shown. The vaporizer will supply gas to a service line and also to the pilot burner 32 and to the main burner 40 which supplies the latent heat of vaporization.

To start the apparatus, it is necessary to grasp an auxiliary lever 41 which is pivotally attached to the cocking lever 16 and to pull upwardly thereon until a lip 16a is engaged by the hook-shaped trigger 21. When this happens, the cocking lever will assume the position shown in Fig. 1. During this movement a spring 43 and a pin 44, both mounted on the cocking lever, will engage a guide pin 34a formed on the plunger 34 which extends through a slot or opening formed in the lever arm 22 and accordingly lift the hammer, the plunger, and the armature 36 upwardly and into engagement with the legs of the electro-magnet so as to assume the position shown in Fig. 1. A second spring 45 also carried by the cocking lever will at the same time engage the arm 23 and thereby swing the trigger arm into engagement with the lip 16a and will furthermore function to retain it there until the hammer 35 is brought into operation. During this movement, the toggle link 17 forces the plunger rod 9 and head 11 downwardly away from the diaphragm 7 and as the liquid gas is under considerable pressure, valve 5 will open and liquid gas will commence to flow through the valve body into the vaporizer and from the vaporizer it will be supplied to the pilot burner 32. This done, it is necessary for the operator to light the pilot burner and still retain a hold on the auxiliary lever 41 for the simple reason that he can not release it until the electro-magnet has become energized because if he did release it, the spring 37, whereby the hammer 35 is actuated, would force the plunger and hammer downwardly and thereby release the trigger. Thus after he has lighted the pilot flame, he must hold the lever 41 for a half a minute or so, until the thermo-couple has assumed a sufficiently high temperature to generate the current required to energize the electro-magnet. When current flows and the magnet is energized, a magnetic field is built up which has sufficient intensity or strength to hold the armature 36 against the pull or pressure exerted by the spring 37. At that time the operator may release the lever 41 and it will then drop from the dotted line position shown in Fig. 1 to the full line position shown, and the entire mechanism will assume the position shown in Fig. 1 until a failure occurs or the pilot flame becomes extinguished.

If the pilot flame becomes extinguished, current generation and flow ceases and the electro-magnet becomes deenergized, and when it does, the armature 36 is released and the plunger, together with the hammer 35, is shot downwardly with considerable force and thereby strikes the lever 22 and releases the trigger 13. The cocking lever 16 is thus released and under the pressure of the spring 12 will assume the position shown in Fig. 2, thereby permitting the valve 5 to instantly close, and once it has closed it can not be re-opened except by the manual operation previously disclosed, and it will naturally not be re-opened until the cause of the failure has been located and repaired.

Where liquid fuels of the character described are employed, high pressures are usually encountered and no matter how carefully a plant is designed and manufactured, a leak will sometimes develop. Such a leak may start a fire exterior of or adjacent the apparatus, and in such an event it would obviously be desirable to automatically shut valve 5 to reduce the fire hazard. In this instance, a fusible low temperature alloy is employed in the construction of pin 19, about which the trigger arm 20 pivots. This pin is subjected to a shear strain when the mechanism assumes the position shown in Fig. 1; hence if the pin is subjected to sufficient heat by a fire it will soften or melt, thereby permitting the lever 16 to pull the trigger arm 20 downwardly and at the same time releasing lever 16 so that valve 5 may be automatically closed.

In many manufacturing operations there is a definite need for high pressure gas, for instance 500 pounds or more. This gas may be natural gas, manufactured gas, or gas obtained from vaporization of liquid fuel, gas of the character heretofore referred to. Where high pressure gas or liquid fuels such as oil, etc., or other fuel, is employed, the automatic closing of the main valve 5 in the event of failure of any character has proven a difficult problem as it has been found difficult to maintain the stuffing box tight to prevent leakage. With the type of valve here disclosed, a stuffing box, together with the troubles accompanying it, are entirely eliminated by the use of the diaphragm 7. Similarly, closing of the valve against high pressure gas is readily overcome by using the type of spring shown at 12, as this may be made heavy enough to hold the valve 5 closed regardless of the gas pressure, or other fuel pressure, exerted.

In many installations, for instance, where plants are employed for household or domestic use, low pressure gas is usually employed, and the pressure on the gas delivered to the house for heating, cooking, etc. will seldom exceed 10 to 12 inches of a water column. All the appliances such a pilot burners, regulators, valves, and fittings are accordingly designed for low pressure, and if high pressure gas should develop, trouble of a serious character would result. In most instances, high pressure is maintained in the service line and low pressure in the house line, as a pressure reducing valve such as indicated at 42, see Fig. 3, is interposed between the service and the house line. A number of causes may permit high pressure gas to enter the house line, for instance, the diaphragm in the reducing valve 42 may rupture, the spring may fail, the linkage mechanism between the diaphragm and valve may stick or break, foreign matter may lodge in the valve seat of the pressure reducing valve and hold it open. If the service line carries high pressure liquid gas, a vaporizing unit will be required, and in that event the vaporizing coils may spring a leak or low water may develop in the heating cycle of the vaporizer. Where a pilot burner is used, for instance, in connection with an automatic water heater, the orifice in the pilot burner may clog or it may blow out from excess gas pressure or draft or possibly from back firing from the main burner, etc. It is because of all the many things that might or could happen that the safety valve 5 should be placed at a point between the service line or source of fuel supply where the entire gas or fuel flows from the service line to the house, and will be shut off in the event of any failure such as heretofore mentioned. By referring to Fig. 3 it will be noted that the safety valve 5 is interposed between the service line 44 and the house line 45. The gas or fuel pressure is reduced by the valve 42 which may be of any suitable type. The gas will thus enter at the desired reduced pressure and may serve for the operation of an automatic hot water heater 46, a gas range 47, and any other appliances such as a basement furnace, floor type heaters, refrigerators, etc. By placing the valve 5 at the point shown and actuating it, for instance, by the pilot burner indicated at 46a, the flow of gas or fuel to all appliances will be shut off in the event of failure of any nature.

The valve and operating mechanism here disclosed is exceedingly simple in construction and operation and is positively dependable, as the valve can not remain open unless the pilot burner is in operation, as the entire operating mechanism depends upon maintaining the electro-magnet energized when the valve is open.

While this and other features of the invention have been more or less specifically described and illustrated, it is to be understood that various changes may be resorted to within the scope of the appended claims.

Having thus described my invention, what I claim and desire to secure by Letters Patent is:

1. In an apparatus of the character described, a casing having a flow passage with a valve seat formed therein, a valve movable to and away from the seat to open or close the flow passage, a spring actuated plunger for holding the valve in closed position, a toggle link connected with the plunger, a cocking lever connected with the toggle link to move the plunger away from the valve to permit opening of the valve, a trigger engageable with the cocking lever when the valve is open, an electro-magnet, a thermo-couple actuated by a pilot burner to supply electric current to energize the magnet, a hammer actuated by and held in raised position by the magnet when energized, said hammer being released upon extinction of the burner and de-energization of the magnet, and when released striking the trigger and releasing the cocking lever, thereby permitting the spring actuated plunger to close the valve.

2. In an apparatus of the character described, a casing having a flow passage with a valve seat formed therein, a valve movable to and away from the seat to open or close the flow passage, a spring actuated plunger for holding the valve in closed position, a toggle link connected with the plunger, a cocking lever connected with the toggle link to move the plunger away from the valve to permit opening of the valve, a trigger engageable with the cocking lever when the valve is open, an electro-magnet thermo-couple actuated by a pilot burner to supply electric current to energize the magnet, a hammer actuated by and held in raised position by the magnet when energized said hammer being released upon extinction of the burner and the de-energization of the magnet and when released striking the trigger and releasing the cocking lever thereby permitting the spring actuated plunger to close the valve; a second lever pivotally connected to the cocking lever, said second lever functioning as a lever to swing the cocking lever to a position where it is engaged by the trigger and means actuated by said second lever for engaging and raising the hammer into engagement with the magnet and for holding the hammer in engagement with the magnet until the magnet becomes energized.

TALLENT H. RANSOME.